(No Model.)
F. C. MERRILL.
HARROW TOOTH.
No. 292,836. Patented Feb. 5, 1884.
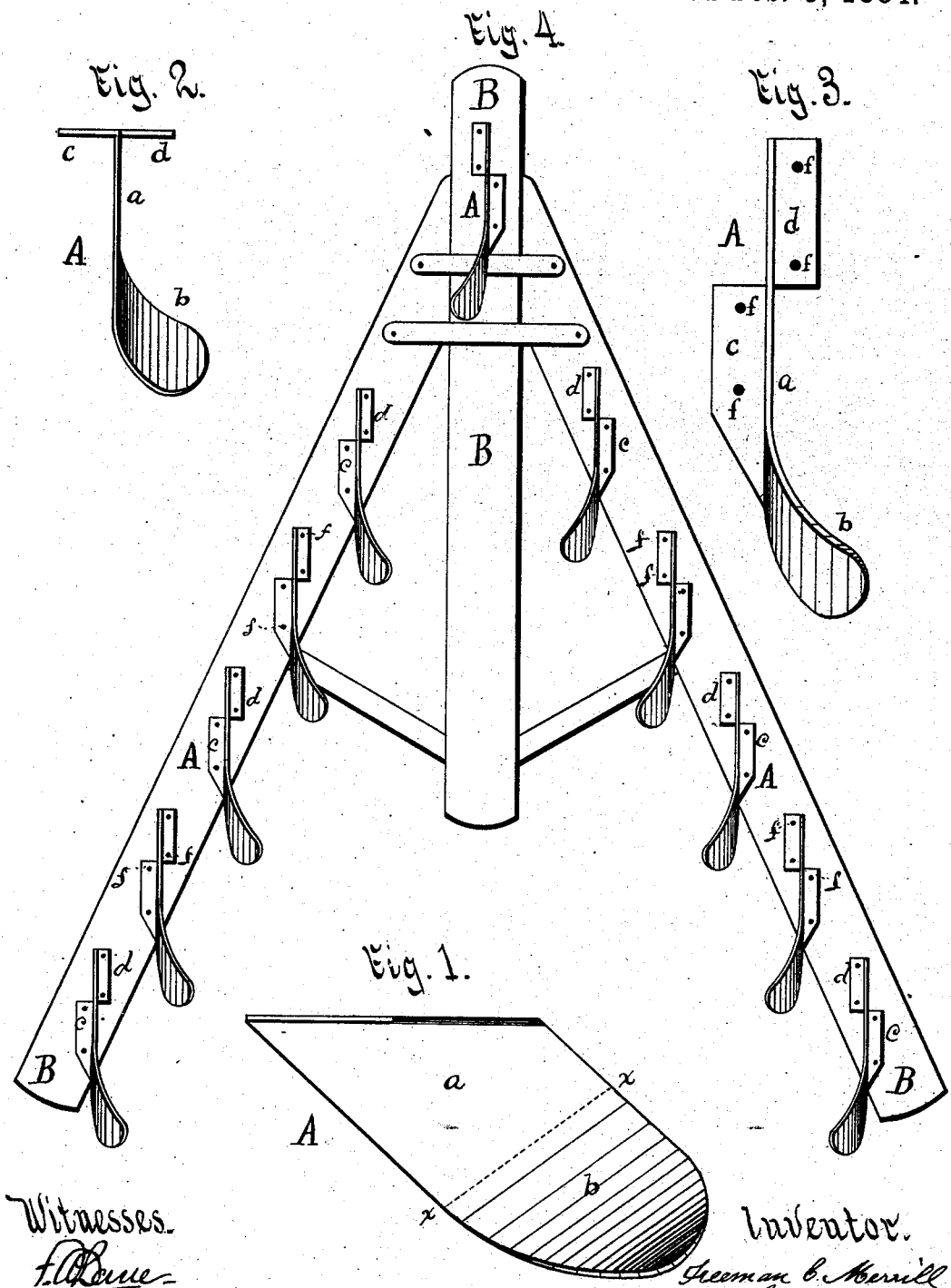
Witnesses.
F. A. Rowe
A. S. Brown
Inventor.
Freeman C. Merrill
By his attorney,
J. S. Brown

UNITED STATES PATENT OFFICE.

FREEMAN C. MERRILL, OF SOUTH PARIS, MAINE.

HARROW-TOOTH.

SPECIFICATION forming part of Letters Patent No. 292,836, dated February 5, 1884.

Application filed July 30, 1883. (No model.)

*To all whom it may concern:*

Be it known that I, FREEMAN C. MERRILL, of South Paris, in the county of Oxford and State of Maine, have invented an Improvement in Harrow-Teeth; and I do hereby declare the following to be a full and exact description thereof, reference being had to the accompanying drawings, making part of this specification—

Figure 1 being a side view of one of my improved harrow-teeth; Fig. 2, a front view of the same; Fig. 3, a bottom view thereof, and Fig. 4 an under side view of a harrow constructed with my improved harrow-teeth.

Like letters designate corresponding parts in all the figures.

My improvement belongs to the class of harrow-teeth known as "colter-teeth," each tooth having a thin cutting-edge, and the rear and lower part of the tooth being turned or curved laterally to lift and work the soil. The teeth are preferably made of thin sheet-steel with the cutter part set so as to cut edgewise through the earth.

In the accompanying drawings, A represents the entire tooth; $a$, the cutting or colter part, and $b$ the bent or curved part which turns or lifts the soil. I make the part $b$ in a peculiar way, substantially as follows: It is bent or curved cylindrically—that is, in the form of a portion of a cylinder, beginning at a line, $x\ x$, Fig. 1, which should be at an angle of forty-five degrees, or approximately at that angle, to the horizon when the tooth is in position, as indicated in the same figure. The angle may vary somewhat or considerably from that above stated; but from experiment and observation I believe substantially that angle to be the best to produce the best result in the field. The entire part $b$ extends through one-sixth of the circumference of a cylinder, or thereabout, to its extreme lower edge, though since the lower edge is preferably rounded, as shown, portions of the said part are less than that proportion of a cylinder. This extent may also vary considerably, though I believe the width above stated to be about the best that can be given. The diameter of the cylinder of which this working part of the tooth-blade is a section is, for the usual size of harrow-teeth, eleven and a half inches, or thereabout, though here, as in the respects named above, I do not wish to confine myself to precise dimensions. The teeth are secured to the harrow B by means of flanges $c\ d$, turned outward from the upper end of the blade, and of bolts $f\ f$, passed through these flanges and the side beams of the harrow. The teeth are all arranged with the colter parts $a\ a$ parallel with one another edgewise in the line of draft, as shown, and at different distances apart, and they may be adjustable to equal distances apart, if preferred. The working parts $b\ b$ are generally all turned inward, as shown, except the middle one, which may turn either way. The teeth, however, might turn outward.

Harrow-teeth have been before made of thin or sheet metal, cutting edgewise, and arranged at angles inclining backward, and such harrow-teeth with sharp edges and a share peculiarly bent laterally have been made, as in Letters Patent No. 261,499, and also of such thin sheet metal, with a twisted blade turned laterally, as in Letters Patent No. 273,697; but my form of harrow-teeth differs essentially from all of these constructions, as fully set forth in the foregoing specification, and as I now claim.

What I claim as my invention is—

A harrow-tooth formed of sheet metal, having the colter part inclined backward, edgewise, and the working part $b$ turned or bent laterally in the form of a section of a cylinder starting from the colter part at a forward inclination of approximately forty degrees and extending one-sixth of a circle, or thereabout, substantially as and for the purpose herein specified.

In testimony whereof I have signed my name in presence of two witnesses.

FREEMAN C. MERRILL.

Witnesses:
CHAS. S. DUDLEY,
FRED W. BONNEY.